(12) United States Patent
Szajnowski

(10) Patent No.: US 6,753,803 B2
(45) Date of Patent: Jun. 22, 2004

(54) SIGNAL DETECTION

(75) Inventor: Wieslaw Jerzy Szajnowski, Guildford (GB)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/112,873

(22) Filed: Apr. 2, 2002

(65) Prior Publication Data

US 2002/0186161 A1 Dec. 12, 2002

(30) Foreign Application Priority Data

Apr. 3, 2001 (EP) .............................................. 01303183

(51) Int. Cl.[7] .............................................. G01S 13/58
(52) U.S. Cl. .............................. 342/62; 342/21; 342/98; 342/109; 342/192
(58) Field of Search .............................. 342/21, 62, 98, 342/99, 104, 109, 111, 115, 116, 192, 193, 189, 196

(56) References Cited

U.S. PATENT DOCUMENTS

| 5,414,428 A | | 5/1995 | Gallagher et al. | |
| 5,786,788 A | * | 7/1998 | Schober et al. | 342/159 |
| 6,118,402 A | * | 9/2000 | Kupfer | 342/149 |
| 6,225,941 B1 | * | 5/2001 | Gogineni et al. | 342/22 |
| 6,232,913 B1 | * | 5/2001 | Lehtinen | 342/137 |
| 6,255,986 B1 | * | 7/2001 | Alberty et al. | 342/174 |
| 6,362,777 B1 | * | 3/2002 | Kawakami et al. | 342/131 |

OTHER PUBLICATIONS

Kesler S B et al: Mismatched filtering of soner signals IEEE Transactions on Aerospace and electronic systems, Sep. 1981, USA, vol. AES–17, No. 5, pp. 730–734.
Description of documents cited on European Search Report.

* cited by examiner

Primary Examiner—Thomas H. Tarcza
Assistant Examiner—Isam Alsomiri
(74) Attorney, Agent, or Firm—Birch, Stewart, Kolasch & Birch, LLP

(57) ABSTRACT

A transmitted signal and a received signal are combined and the combination is expected to determine whether or not a target signal is present. Either the transmitted signal or the received signal is combined with an auxiliary signal containing a range of frequencies corresponding to an anticipated Doppler shift, so that an output of the combined transmitted and received signal will be present only if a target signal exhibiting a Doppler shift within the anticipated range is present. The auxiliary signal preferably comprises finite-duration signal portions of different types so as to provide a substantially uniform frequency response throughout the selected range.

26 Claims, 15 Drawing Sheets a $d_{CE}(j)$ b $d_{SE}(j)$ a b a b

SIGNAL DETECTION

FIELD OF THE INVENTION

This invention relates to a method and apparatus for detecting signals. The invention is especially, but not exclusively, applicable to systems which may be subject to an unknown Doppler frequency shift affecting modulated coherent signals used for communication and ranging purposes, and particularly substantially continuous signals modulated by random or chaotic waveforms utilized by obstacle detection or collision avoidance systems.

BACKGROUND OF THE INVENTION

Such systems are designed to operate in multiuser and often hostile environments, and are intended for a wide range of applications, including automotive applications, industrial robotics and unmanned vehicle navigation.

FIG. 1 is a block diagram of a typical microwave obstacle-detection system. The system comprises a signal generator 1 that produces a substantially continuous waveform x(t) with suitable bandwidth to provide required range resolution. The waveform x(t) may be deterministic (periodic or aperiodic), chaotic or purely random.

The system also has a microwave oscillator 2 that generates a sinusoidal signal with required carrier frequency, a modulator 3 that modulates one or more of the parameters (such as amplitude, phase, or frequency) of the carrier signal with the modulating waveform x(t), a power amplifier (PA) 4 that amplifies the modulated carrier signal to a required level, a microwave transmit antenna (TA) 5 that radiates an electromagnetic wave representing the modulated carrier signal towards an obstacle 6, a microwave receive antenna (RA) 7 that receives an electromagnetic wave reflected back by the obstacle 6, an input amplifier (IA) 8 that amplifies a signal provided by the receive antenna (RA) 7, and a coherent demodulator 9 that processes jointly the reference carrier signal supplied by the oscillator 2 and a signal supplied by the input amplifier (IA) 8 to reconstruct a time-delayed replica y(t) of the modulating waveform x(t).

The modulating waveform x(t) and its time-delayed replica y(t) are then processed jointly during a specified time interval by a suitable processor 10, such as correlator, to produce an estimate of the unknown time delay that is proportional to the distance (range) between the system and the obstacle 6.

FIG. 2 shows an example of a correlation function of a synchronous random binary waveform.

When there occurs a relative movement between a ranging system and an obstacle of interest, an electromagnetic wave reflected back by the obstacle and received by a coherent system will exhibit a Doppler frequency shift. The value $\omega_{D0}$ of this (angular) frequency shift can be determined from:

$$\omega_{D0} = \frac{2v_0}{c}\omega_0$$

where $v_0$ is the radial speed (i.e., the range rate) of a relative movement between the system and the obstacle and $\omega_0$ is the (angular) carrier frequency of a transmitted electromagnetic wave having velocity c.

The signal reflected back by a moving obstacle can be expressed as:

$$z_r(t) = \gamma x(t-\tau_0) \cos[(\omega_0+\omega_{D0})(t-\tau_0)+\theta]$$

where $\gamma$ is the round-trip attenuation, $\tau_0$ is the delay corresponding to the range D, $\omega_{D0}$ is the Doppler frequency shift, and $\theta$ is an unknown constant phase shift. Strictly speaking, the value of $\tau_0$ cannot be constant for a nonzero Doppler frequency $\omega_{D0}$. However, in most practical cases it is assumed that the small changes in range D, of the order of the wavelength of the carrier frequency, cannot be discerned when determining a short-time time-delay estimate. Such assumption justifies decoupling delay and Doppler frequency measurements.

A baseband signal corresponding to the received signal $z_r(t)$ has the form $$y(t) = x(t-\tau_0)\cos(\omega_{D0}t+\phi)$$

where $\phi$ is an unknown phase shift.

The correlator performs the following operation $$R_{xy}(\tau) = \frac{1}{T_0}\int_0^{T_0} x(t-\tau)x(t-\tau_0)\cos(\omega_{D0}t+\varphi)dt$$

where the integral is evaluated for a plurality of hypothesized time delays $\tau_{min}<\tau<\tau_{max}$. When the observation interval $T_0$ is much shorter than one period $(2\pi/\omega_{D0})$ of the Doppler frequency, the value of $\cos(\omega_{D0}t_m+\phi)$ is almost constant during $T_0$, so that the correlation integral can be approximated by $$R_{xy}(\tau) \approx \frac{1}{T_0}\cos(\omega_{D0}t_m+\varphi)\int_0^{T_0} x(t-\tau)x(t-\tau_0)dt$$

where the time instant $t_m$ is taken in the middle of the observation interval $T_0$.

When the correlation integral is calculated repeatedly for successive short processing intervals, each of duration $T_0$, the sequence of observed correlation functions may be represented by the plot of FIG. 3. The rate of change (in time) of the correlation function $R_{xy}(\tau)$ will correspond to the Doppler frequency $\omega_{D0}$. The value of this frequency can be determined by applying some suitable form of spectral analysis.

FIG. 4 is a block diagram of a conventional correlator, comprising variable delay line 11, multiplier 12 and integrator 13, followed by a spectrum analyser 14. When the total number of successive short processing intervals is large enough, the frequency spectrum $S(\omega)$, observed at the output of the analyser, will exhibit a pronounced peak at the Doppler frequency $\omega_{D0}$.

FIG. 5 is a block diagram of a multichannel correlator that uses a tapped delay line 15 to cover the entire interval of hypothesized time delays, $\tau_{min}<\tau<\tau_{max}$, in J steps of unit delay $\Delta$ using delay circuits 16. Multipliers 17 process the delayed signals wiith y(t) and provide the outputs to integrators 18. The required spectral analysis may be performed by a digital processor 19 implementing the Discrete Fourier Transform (DFT). The principle of operation is thus similar to that of FIG. 4.

The systems shown in FIGS. 4 and 5, and also other similar known systems, attempt to approximate the correlation integral with two parameters of interest, delay time $\tau$ and Doppler frequency $\omega_D$ by combining a time sequence of correlation functions determined over a number of relatively short observation intervals $T_0$. Because of this approximation, such systems can only provide suboptimal solutions to the problem of joint estimation of time delay and Doppler frequency.

Another prior art technique involves determining values of the following correlation integral $$R_{xy}(\tau, \omega_D; \varphi) = \frac{1}{T_0}\int_0^{T_0} x(t-\tau)\cos(\omega_D t + \varphi)y(t)dt$$

for the entire interval of hypothesized time delays $$\tau_{min} < \tau < \tau_{max},$$

and also for the entire interval of hypothesized Doppler frequencies $$\omega_{Dmin} < \omega_D < \omega_{Dmax};$$

the unknown phase $\varphi$ should also be varied over the interval $(0, 2\pi)$. In this case, values of the correlation integral, determined for some prescribed range of argument values $(\tau, \omega_D)$, define a two-dimensional correlation function. The specific values of arguments $\tau$ and $\omega_D$, say $\tau_0$ and $\omega_{D0}$, that maximise the two-dimensional correlation function provide estimates of unknown time delay and unknown Doppler frequency.

SUMMARY OF THE INVENTION

FIG. 6 is a block diagram of a suitable system capable of determining values of the correlation integral for some specified time delays $\tau$ and Doppler frequencies $\omega_D$. The system is formed by a correlator like that of FIG. 4, including variable delay line 11, multiplier 12 and integrator 13. However, the signal x(t) is first applied to a multiplier 20 which multiplies it by a variable Doppler signal $\cos(\omega_D t + \varphi)$.

The procedure of adjusting the unknown value of phase $\varphi$ can be avoided by suitably combining the values of the following two integrals:

$$R_{xyc}(\tau, \omega_D; \varphi) = \frac{1}{T_0}\int_0^{T_0} y(t)x(t-\tau)\cos(\omega_D t)dt \quad (1)$$

$$R_{xys}(\tau, \omega_D; \varphi) = \frac{1}{T_0}\int_0^{T_0} y(t)x(t-\tau)\sin(\omega_D t)dt \quad (2)$$

evaluated for the entire interval of hypothesized time delays $$\tau_{min} < \tau < \tau_{max}$$

and the entire interval of hypothesized Doppler frequencies $$\omega_{Dmin} < \omega_D < \omega_{Dmax}.$$

In many industrial and automotive applications, systems capable of detecting moving obstacles and employing substantially continuous modulated microwave (or other coherent radiation), developed in accordance with the prior art, will be too complicated and also too expensive.

Furthermore, obstacle-detection systems designed for multiuser environments will preferably exploit some suitable form of random or chaotic modulation which may preclude the use of conventional Doppler signal processors constructed in accordance with the prior art.

Aspects of the present invention are set out in the accompanying claims.

In accordance with a further aspect of the invention, representations of a transmitted signal and a received signal are processed together in such a manner as to determine whether or not a target signal is present (this target signal possibly representing an object reflecting the transmitted signal). An auxiliary representation, for example formed of one or more auxiliary signals, is introduced into the process. The auxiliary representation includes frequencies distributed throughout a range which corresponds to anticipated frequency modifications (for example Doppler shifts) in the target signal, as a result of which the system has response characteristics such that a target signal exhibiting frequency modifications within this range will give rise to a significant system output, whereas frequency modifications outside this range will not.

Such an arrangement avoids the need for determining the value of the frequency modification (e.g. Doppler shift) but enables the rapid detection of any target signal incorporating a frequency modification of interest, using a simple structure. The above-mentioned arrangement is thus particularly useful in applications where it is sufficient to discriminate between stationary obstacles and obstacles moving with specified velocities, and for applications in which obstacles are placed into a number of classes according to obstacle velocity, for example zero/low, moderate/average, high/very high.

Preferred aspects of the present invention are directed to the nature of the auxiliary representation and give rise to a number of advantages as explained below.

Preferably, the auxiliary representation is in the form of finite-duration signal portions comprising multiple frequencies within the range of interest, and preferably distributed throughout this range. The duration of the signal portions is selected so as to maintain orthogonality of the components of the respective frequencies. By using finite-duration portions and selecting the shapes of these portions appropriately, it is possible to extend the system response characteristics such that a significant output is produced for not only target signal frequencies equal to those of the signal components used to construct the auxiliary representation, but also adjacent frequencies.

Preferably, each signal portion is created using a window function which results in a significant frequency response for all frequencies within the range of interest. However, it is difficult to arrange for a signal portion to produce a flat response throughout the frequency range of interest.

For this reason, in accordance with a preferred embodiment of the invention, the auxiliary representation comprises different finite-duration signal portions, each comprising components having a respective set of frequencies, and arranged such that they give rise to complementary frequency response characteristics. Accordingly, by combining the results achieved using the respective different auxiliary signal portions, it is possible to get an overall frequency response characteristic which is significantly flatter than if only one type of signal portion were used.

Preferably, each signal portion comprises components of frequencies interleaved with those of the other signal portion or portions.

An indicated by FIG. 3, at any given instant the correlation function may have a low level depending upon the phase of the Doppler shift. In order to ensure a significant output irrespective of the unknown phase, the auxiliary representation preferably comprises a first representation and a second representation, the components of respective frequencies in the first representation having a quadrature phase relationship with the corresponding frequency components in the second representation. By combining the responses achieved as a result of theses two auxiliary signals, the output is substantially unaffected by the phase of the Doppler shift.

Accordingly, in the preferred embodiment, there are at least four types of auxiliary signal portions: signal portions which differ in that they comprise frequencies interleaved with frequencies of other portions, and signal portions which differ in that their frequency components are in quadrature relationship with those of other portions.

The preferred embodiment uses four types of signal portions, but it would be possible to produce a system which uses more types, while maintaining the advantages indicated above. For example, the frequency components may be split into three or more sub-sets.

It would be desirable to synthesise digitally the auxiliary representation. In order to facilitate this, the auxiliary representation preferably exhibits small values of the peak factor, i.e., the peak value divided by its root-mean square value. Minimising this enables the waveform to be represented digitally with a minimum number of bits for a specified reconstruction error.

A small peak factor can be achieved by appropriate selection of the initial phase values of the signal components for each signal portion.

In the preferred embodiment described below, the transmitted and received representations are signals which are combined by correlation. However, other arrangements are possible. For example, the received signal may be modified (e.g. multiplied) by the auxiliary representation and then delivered to a filter matched to the characteristics of the transmitted signal. This use of matched filters, which utilise a representation of the transmitted signal rather than the signal itself, is, per se, known in the art.

In another alternative embodiment, the correlator is replaced by a suitably modified version of the time-delay discriminator described in WO-A-00/39643, the contents of which are incorporated herein.

Although the present invention is being described primarily in the context of detection of obstacles which produce a Doppler shift in a reflected signal, the invention is applicable also in other areas. For example, the invention is applicable to communication systems in which the local oscillators in the transmitter and receiver may not be accurately matched; a frequency offset between the oscillators would give rise to a frequency shift similar to a Doppler shift. The invention thus permits use of equipment which has wider tolerances, and is thus less expensive, than prior art arrangements.

The invention relates both to a method of signal processing and to apparatus operating according to such a method.

Arrangements embodying the invention will now be described by way of example with reference to the accompanying drawings.

DETAILED DESCRIPTION

Figure 7:
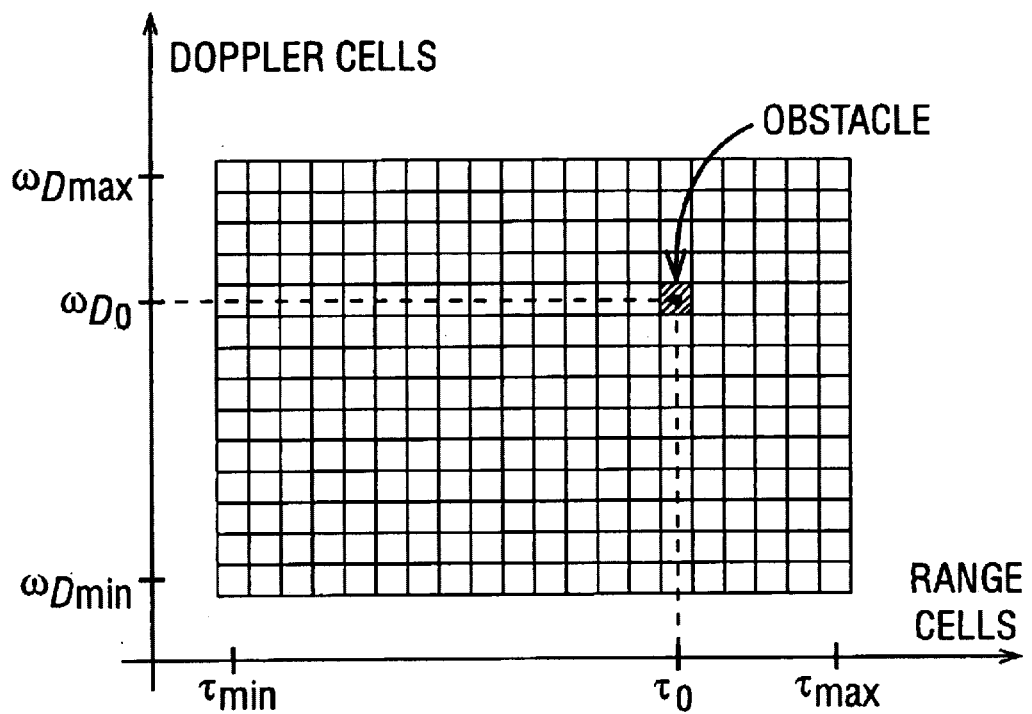
FIG. 7 is a representation of the time-frequency plane divided into range-Doppler resolution cells.

FIG. 7 shows a representation of the time-frequency plane divided into range-Doppler resolution cells and a hypothetical obstacle occupying a single cell. Prior art arrangements are designed to establish the coordinates $\tau_0, \omega_{D0}$ of the cell.

When obstacles are to be classified into only two alternative classes: obstacles moving with specified velocities and all other obstacles, the time-frequency plane will be divided into a number of resolution cells equal to the number of required range cells. An obstacle detected in any of those resolution cells will have the range specified by that cell, but its velocity may be one of the plurality of admissible velocities, corresponding to an entire interval of Doppler frequencies $\omega_D$, say, $\omega_{Dmin} < \omega_D < \omega_{Dmax}$.

Figure 8:
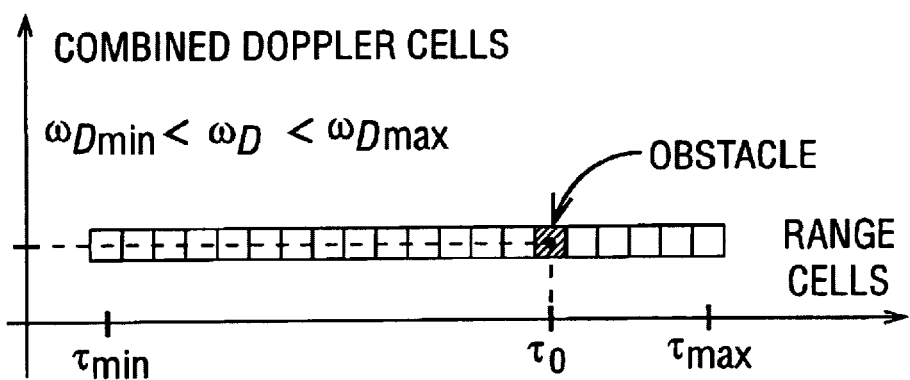
FIG. 8 is a representation of the time-frequency plane divided into range resolution cells for a specified interval of Doppler frequencies.

FIG. 8 is a representation of the time-frequency plane divided into a number of range resolution cells for a specified interval of Doppler frequencies. An obstacle located at the range cell $\tau_0$ may have a radial velocity within an interval of velocities corresponding to the entire Doppler interval $\omega_{Dmin} < \omega_D < \omega_{Dmax}$.

In order to detect obstacles moving with any of the specified velocities, the two correlation integrals, given by (1) and (2), can be replaced by $$R_{xyc}(\tau, \omega_D; \varphi) = \frac{1}{T_0} \int_0^{T_0} y(t)x(t-\tau)d_C(t)dt \qquad (3)$$

$$R_{xys}(\tau, \omega_D; \varphi) = \frac{1}{T_0} \int_0^{T_0} y(t)x(t-\tau)d_S(t)dt \qquad (4)$$

where $d_C(t)$ and $d_S(t)$ are especially designed auxiliary signals comprising a plurality of suitable frequency components.

The auxiliary signals $d_c(t)$ and $d_s(t)$ should be designed in such a way as:
- to contain all, mutually orthogonal within the interval $T_0$, frequency components covering the entire interval of Doppler frequencies of interest;
- to contain two quadrature components at each frequency of interest, thus providing independence of unknown phase shift;
- to exhibit small values of the peak factor (i.e., the peak value of a waveform divided by its root-mean-square value) required to represent an analogue waveform digitally with a minimum number of bits for a specified value of a reconstruction error;
- to provide a signal processor with a flat frequency response over the entire interval of frequencies of interest, and also a required attenuation at all other Doppler frequencies.

According to a preferred embodiment of the present invention, the two auxiliary signals, $d_C(t)$ and $d_S(t)$, are obtained by suitably combining four finite-duration chirps, $d_{CE}(t)$, $d_{SE}(t)$, $d_{CO}(t)$ and $d_{SO}(t)$, defined by:

$$d_{CE}(t) = w_E(t) \sum_{k=1}^{K} \cos[2\pi(2k+u)f_p t + \alpha_k] \qquad (5)$$

$$d_{SE}(t) = -w_E(t) \sum_{k=1}^{K} \sin[2\pi(2k+u)f_p t + \alpha_k] \qquad (6)$$

$$d_{CO}(t) = w_O(t) \sum_{k=1}^{K} \cos[2\pi(2k+1+u)f_p t + \beta_k] \qquad (7)$$

$$d_{SO}(t) = -w_O(t) \sum_{k=1}^{K} \sin[2\pi(2k+1+u)f_p t + \beta_k] \qquad (8)$$

where $w_E(t)$ and $w_O(t)$ are suitable window (or tapering) functions, K is the number of even or odd frequency components, u is the integer frequency shift, $f_p$ is the fundamental frequency, and $\alpha_k$ and $\beta_k$ are phase angles so selected as to obtain the minimum, or at least low, value of the peak factor.

The chirp $d_{SE}(t)$ is a quadrature copy of the corresponding chirp $d_{CE}(t)$; similarly, the chirp $d_{SO}(t)$ is a quadrature copy of the corresponding chirp $d_{CO}(t)$. All harmonics of the fundamental frequency $f_p$ are shifted (by u) and split into two sets, each comprising either even or odd harmonics. Those sets are then employed to synthesize two orthogonal groups of chirps: $\{d_{CE}(t), d_{SE}(t)\}$, and $\{d_{CO}(t), d_{SO}(t)\}$.

Window functions $w_E(t)$ and $w_O(t)$ belong to a large class of known and widely used window functions, such as Blackman windows, Kaiser-Bessel windows or Dolph-Chebyshev windows. The duration $T_w$ of a selected window is so chosen as to exploit the orthogonality of the frequency components, and the window type and shape are mainly determined by a required frequency resolution at each Doppler frequency of interest.

In order to simplify the optimisation procedure and also to obtain symmetrical chirps, the values of phases $\alpha_k$ and $\beta_k$ can be restricted to only two values, 0 and $\pi$. In such a case, the four chirps, $d_{CE}(t)$, $d_{SE}(t)$, $d_{CO}(t)$ and $d_{SO}(t)$ will be synthesized as follows:

$$d_{CE}(t) = w_E(t) \sum_{k=1}^{K} a_k \cos[2\pi(2k+u)f_p t] \qquad (9)$$

$$d_{SE}(t) = -w_E(t) \sum_{k=1}^{K} a_k \sin[2\pi(2k+u)f_p t] \qquad (10)$$

$$d_{CO}(t) = w_O(t) \sum_{k=1}^{K} b_k \cos[2\pi(2k+1+u)f_p t] \qquad (11)$$

$$d_{SO}(t) = -w_O(t) \sum_{k=1}^{K} b_k \sin[2\pi(2k+1+u)f_p t] \qquad (12)$$

where the coefficients $\alpha_k$ and $\beta_k$ may assume only two values +1 or −1, and are so selected as to minimize the value of the peak factor.

A signal processor determining and combining the values of the two correlation integrals (3) and (4) will be referred to as a "Doppler-tolerant" signal processor. The resulting wideband Doppler compensation will make all obstacles of interest detectable ('visible') at the output of a Doppler-tolerant signal processor, while all other obstacles will be strongly attenuated.

Figure 9:
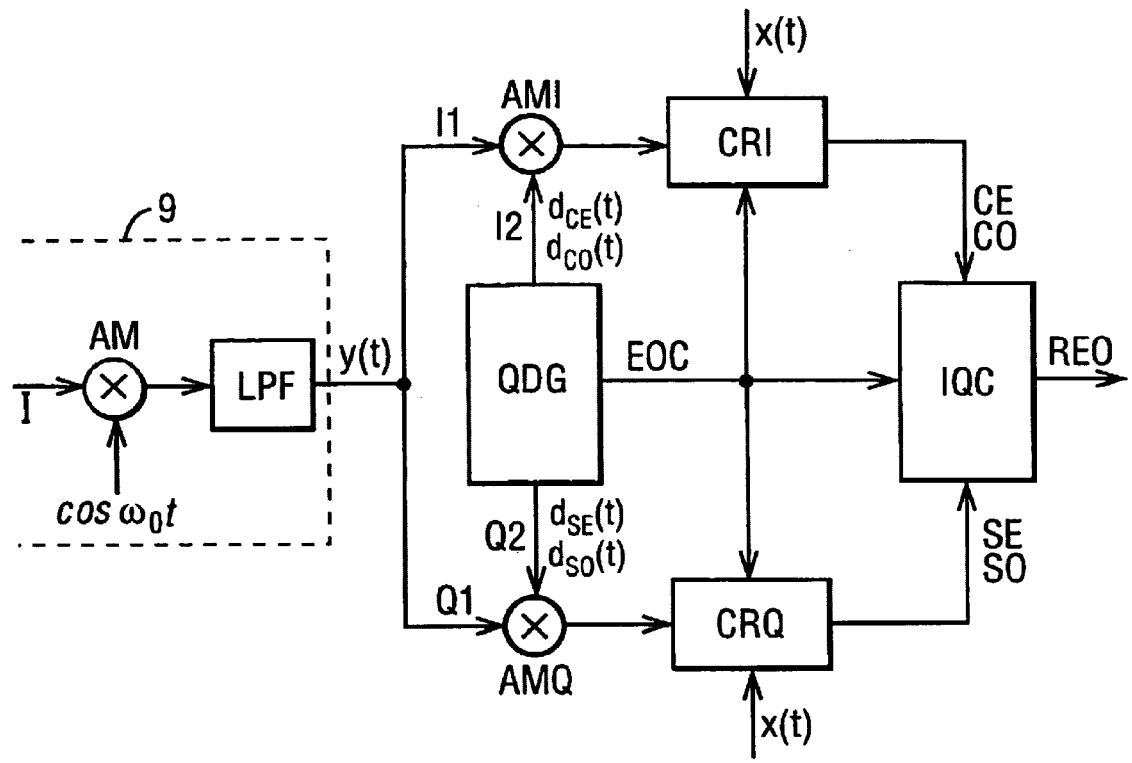
FIG. 9 is a block diagram of a two-channel Doppler-tolerant signal processor in accordance with the present invention.

FIG. 9 is a block diagram of a two-channel Doppler-tolerant signal processor, incorporating a quadrature Doppler generator QDG, according to the present invention. The processor utilizes two identical signal processing blocks, CRI and CRQ, either of which may be a conventional correlator or another appropriate signal processor. In the following, it will be assumed that each of the blocks CRI and CRQ is a conventional multichannel correlator.

Figure 5:
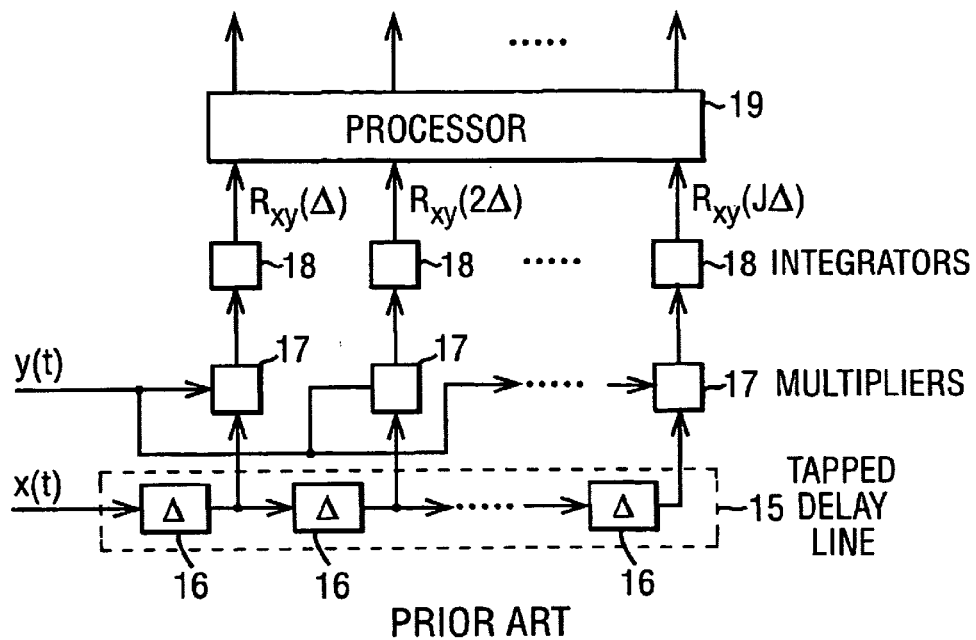
FIG. 5 A block diagram of a multichannel correlator followed by a digital processor implementing the Discrete Fourier Transform.
Figure 6:
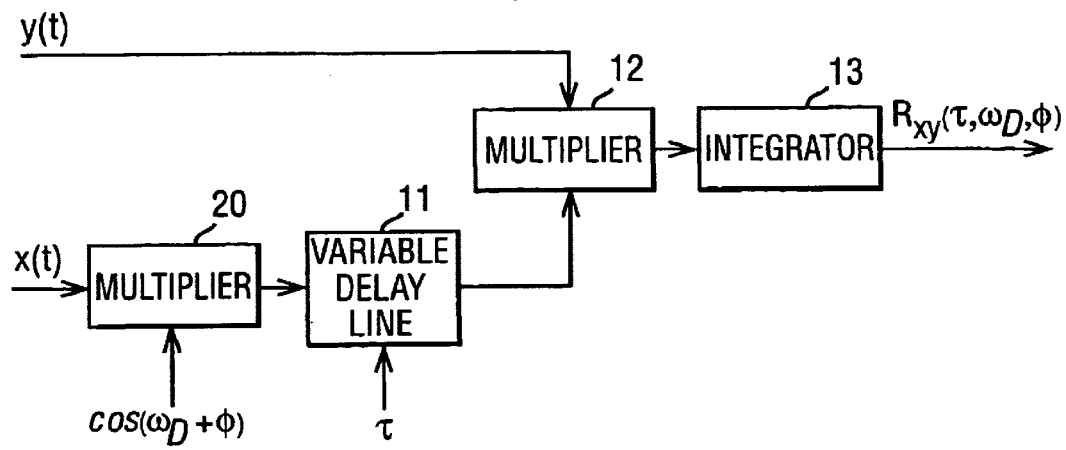
FIG. 6 is a block diagram of a system for determining values of the correlation integral for various time delays and various Doppler frequencies.
Figure 10:
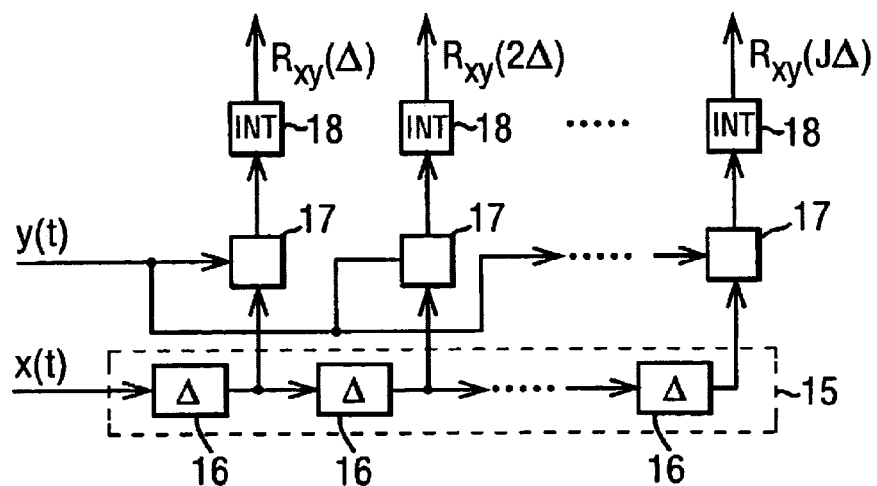
FIG. 10 is a block diagram of a multichannel correlator constructed in accordance with the prior art.

FIG. 10 is a block diagram of a multichannel correlator, constructed in accordance with the prior art (see FIG. 5), which is an example of a suitable structure for each of blocks CRI and CRQ. The correlator provides J discrete values of the correlation function determined at the multiples of unit delay $\Delta$.

In the two-channel Doppler-tolerant signal processor of FIG. 9, the function of Doppler compensation is implemented jointly by a quadrature Doppler generator QDG, two analogue multipliers, AMI and AMQ, and a channel combiner IQC.

A complete set of operations is performed by the two-channel signal processor during a basic processing time interval $2T_w$ split into two equal subintervals $T_w$, referred to as an even cycle and an odd cycle.

Figure 1:
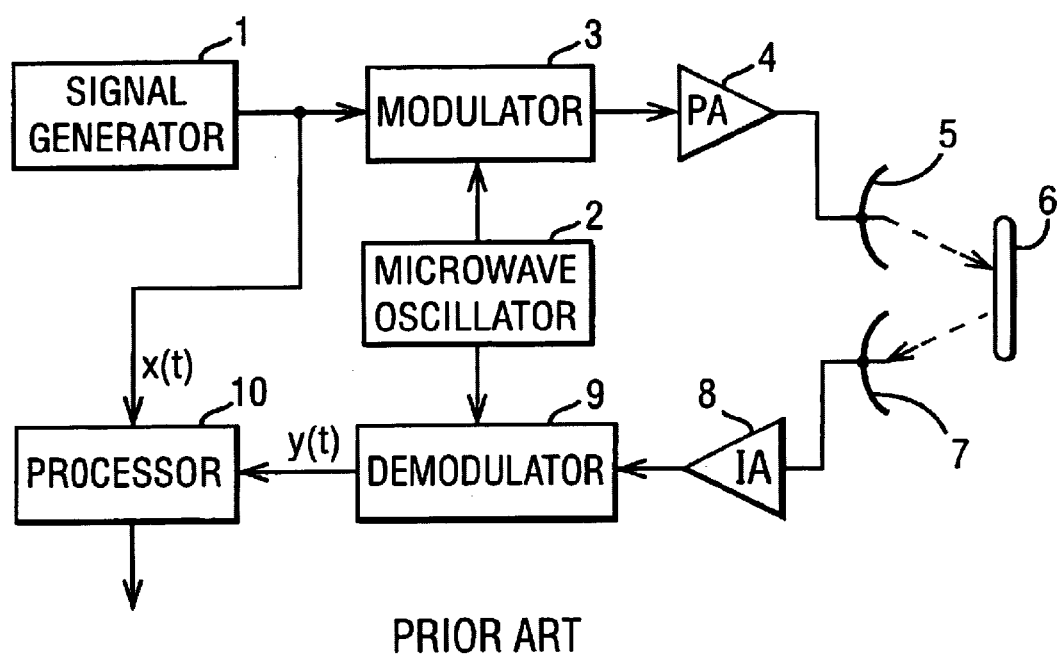
FIG. 1 is a block diagram of a typical microwave obstacle-detection system.
Figure 2:
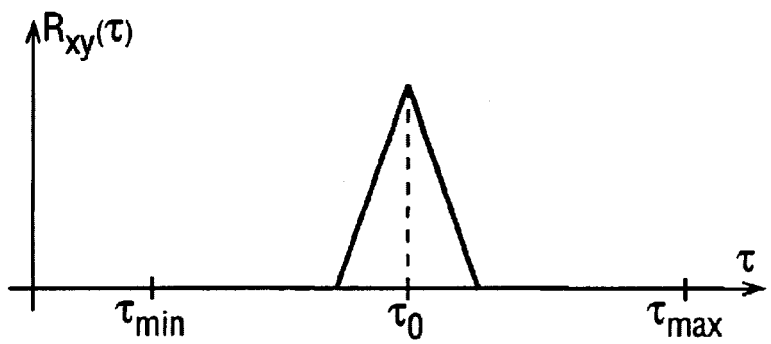
FIG. 2 is a correlation function of a synchronous random binary waveform.
Figure 3:
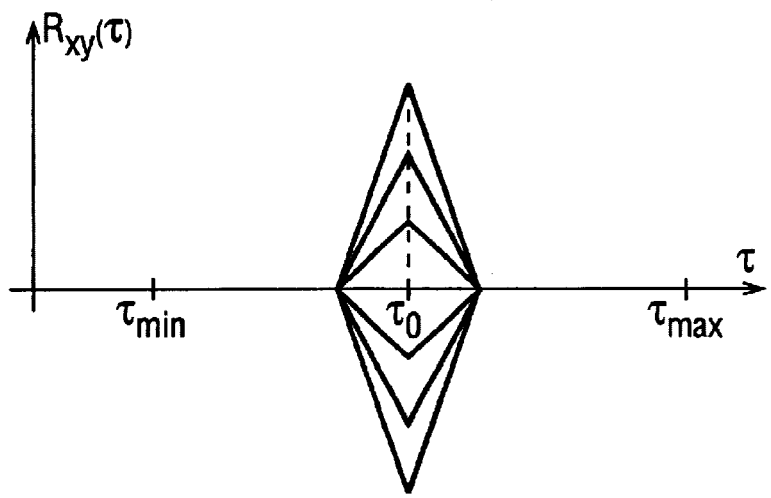
FIG. 3 shows the effects of different values of phase of the Doppler shift in a target signal on the correlation function of a synchronous random binary waveform.
Figure 4:
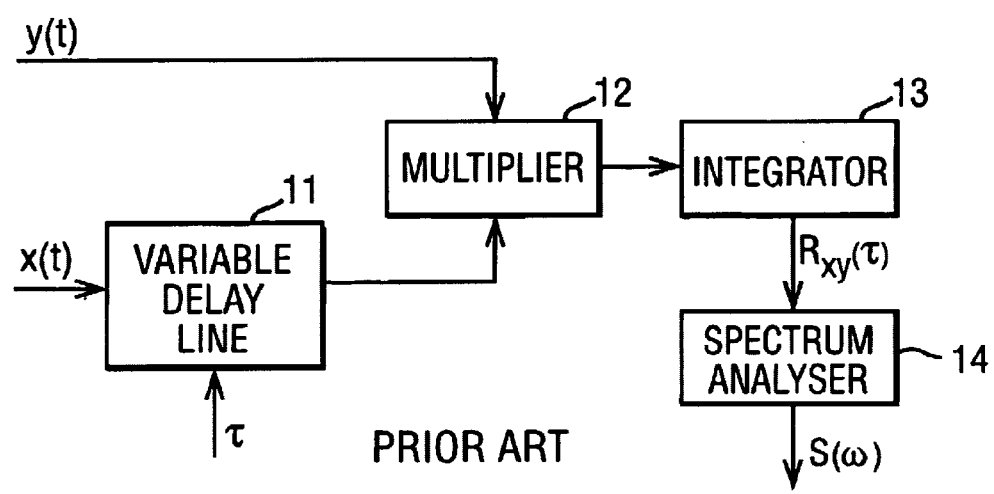
FIG. 4 is a block diagram of a conventional correlator followed by a spectrum analyser.

A baseband signal y(t), supplied by the coherent demodulator 9 in FIG. 1 (shown here as comprising a mixer AM for mixing the input signal with a local oscillator signal, followed by a low pass filter LPF), is applied simultaneously to inputs I1 and Q1 of the multipliers AMI and AMQ, respectively. The other two inputs, I2 and Q2, of the multipliers are driven by auxiliary signals produced by the quadrature Doppler generator QDG.

During an even cycle, the generator QDG produces simultaneously two chirps: $d_{CE}(t)$ at output I2, and $d_{SE}(t)$ at output Q2. During an odd cycle, another two chirps, $d_{CO}(t)$ and $d_{SO}(t)$, are produced simultaneously at outputs I2 and Q2, respectively. When the processing interval $2T_w$ is replicated, the alternate cycles contain chirps $d_{CE}(t)$ and $d_{CO}(t)$ which will thus form a periodic auxiliary signal $d_C(t)$. Similarly, a periodic auxiliary signal $d_S(t)$ will be obtained by periodic extension of combined chirps $d_{SE}(t)$ and $d_{SO}(t)$. Each of these two resulting quadrature signals, $d_C(t)$ and $d_S(t)$, contains the same frequency components covering the entire hypothesized Doppler frequency range of interest.

The generator QDG also produces a pulse train EOC to indicate the time instants of cycle transitions, but not necessarily a particular even or odd cycle.

Figure 11:
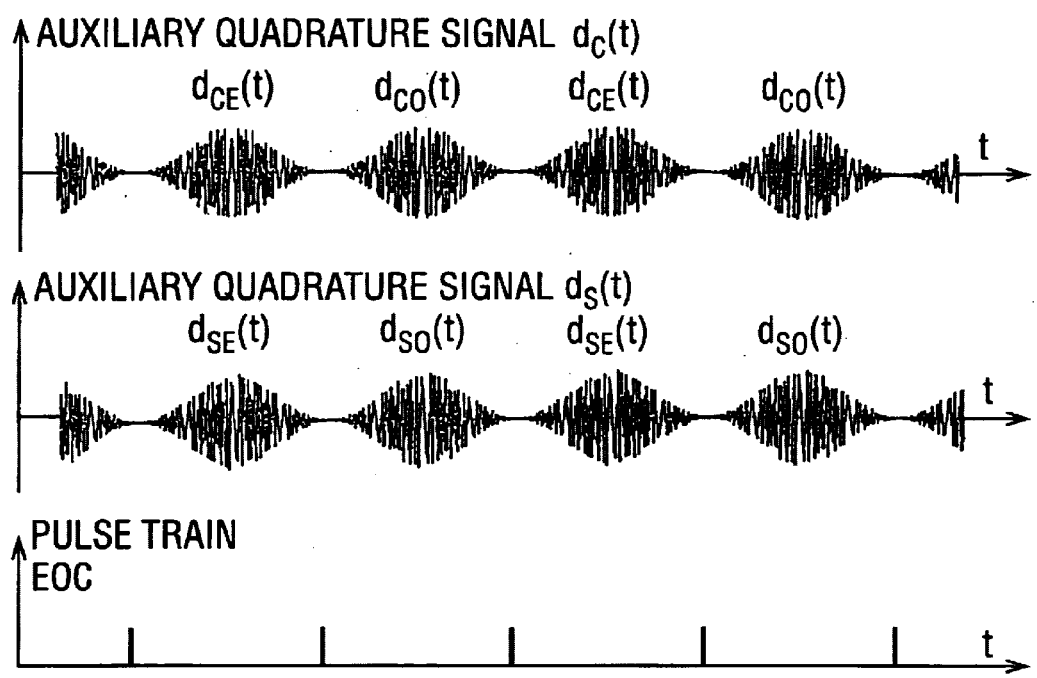
FIG. 11 is an example of an auxiliary representation in the form of signal portions for use in the processor of FIG. 9.

FIG. 11 shows an example of two auxiliary quadrature signals, $d_C(t)$ and $d_S(t)$, and a pulse train EOC produced by the quadrature Doppler generator QDG.

Each correlator, CRI or CRQ, processes jointly a reference signal x(t) and a signal supplied by the corresponding multiplier, AMI or AMQ, during even and odd cycles. These cycles, each of duration $T_w$, are initiated by consecutive pulses of the pulse train EOC. Results presented at the output of the correlator CRI, after completing an even cycle and an odd cycle, are denoted by CE and CO, respectively. Similarly, SE and SO denote results obtained at the output of the correlator CRQ after completing an even cycle and an odd cycle, respectively.

During an even cycle, the channel combiner IQC determines a representation of $$RE = \sqrt{CE^2 + SE^2}$$

and during an odd cycle, IQC determines a representation of $$RO = \sqrt{CO^2 + SO^2}$$

The above representations can be determined with the use of a conventional 'Pythagoras processor' or another suitable processor constructed according to the prior art.

In order to simplify the structure of the channel combiner IQC, the values of RE and RO can also be determined from some suitable approximations. For example, $$RE \approx \max\{|CE|, |SE|\} + 0.5 \min\{|CE|, |SE|\}$$

$$RO \approx \max\{|CO|, |SO|\} + 0.5 \min\{|CO|, |SO|\}$$

Other approximations can also be constructed as known in the art.

Representations of RE and RO, determined for a prescribed number L of the processing intervals $2T_w$, are suitably combined together, e.g., added or averaged, and then the resulting combined representation REO is provided at the output of the combiner IQC. For example, for a single observation interval, L=1 and REO=RE+RO. All operations performed by the channel combiner can be implemented either by a special-purpose digital processor or by a standard programmable digital signal processor.

For obstacle detection purposes, the combined representation REO is to be compared to a predetermined decision threshold. Obstacle detection will be declared in those delay (range) cells, where the threshold has been exceeded by the corresponding value of the combined representation REO.

Figure 12:
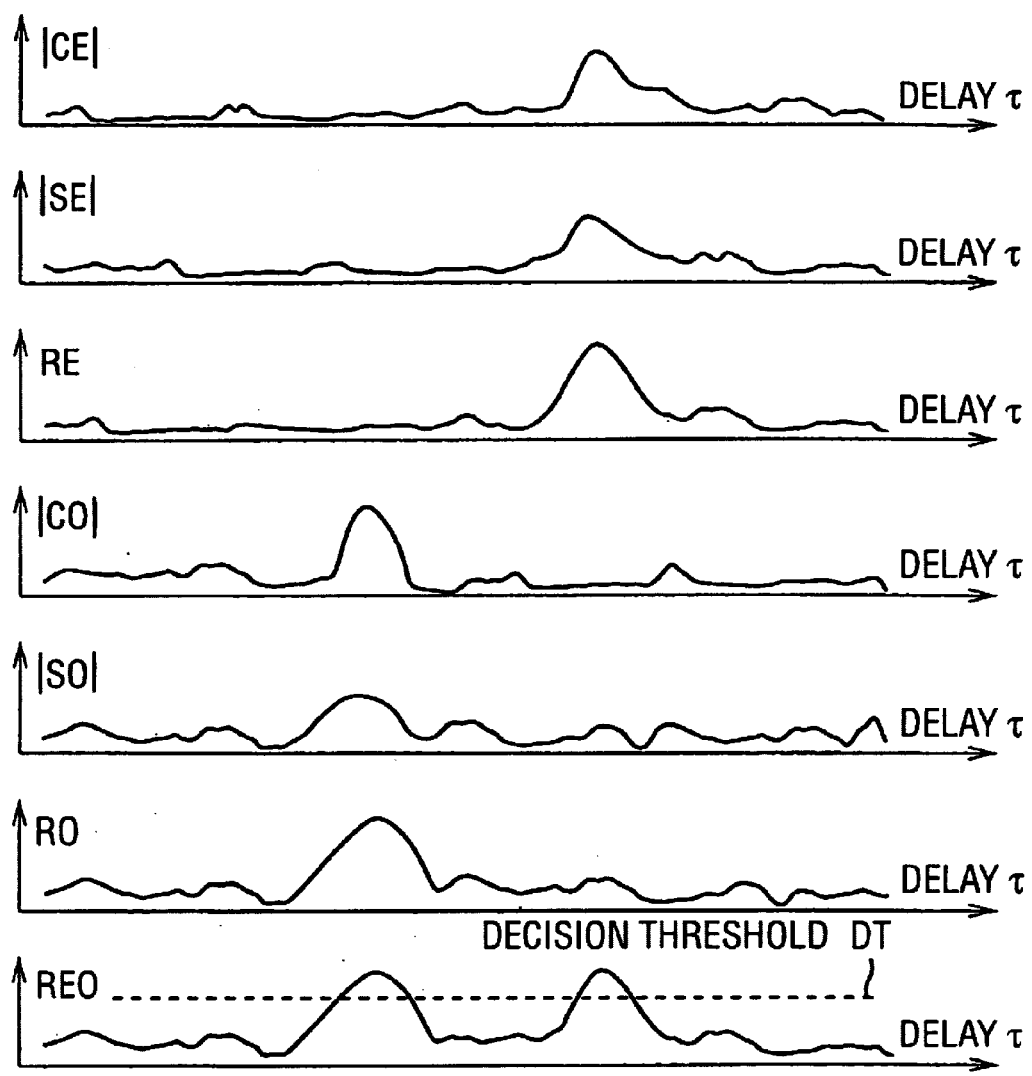
FIG. 12 schematically illustrates an example of operations performed by a channel combiner of the processor of FIG. 9.

FIG. 12 is a schematic illustration of an example of operations performed by the channel combiner IQC and the resulting detection decisions, which employ a decision threshold DT.

Figure 13:
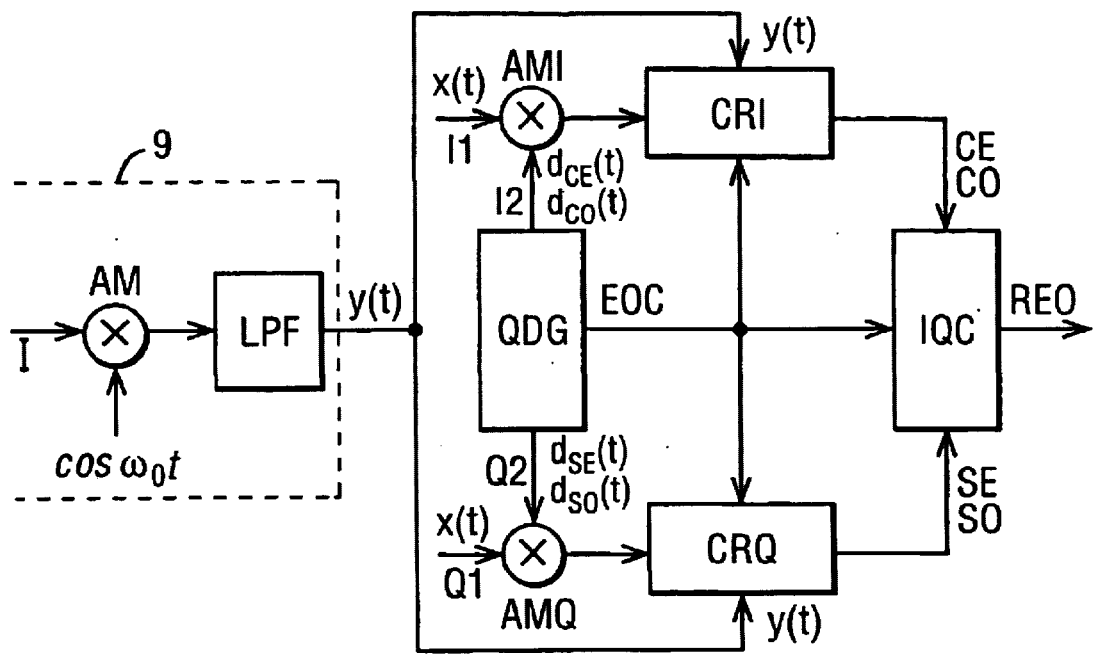
FIG. 13 shows an alternative configuration of a two-channel Doppler-tolerant signal processor in accordance with the present invention.

FIG. 13 shows an alternative configuration of a two-channel Doppler-tolerant signal processor with Doppler compensation. In this case, it is the reference signal x(t), and not a demodulated signal y(t), that is multiplied by the chirps: $d_{CE}(t)$, $d_{SE}(t)$, $d_{CO}(t)$ and $d_{SO}(t)$ produced by the quadrature Doppler generator QDG. Except for this modification, all operations and functions performed by the processor remain identical to those performed by the configuration shown in FIG. 9.

Figure 14:
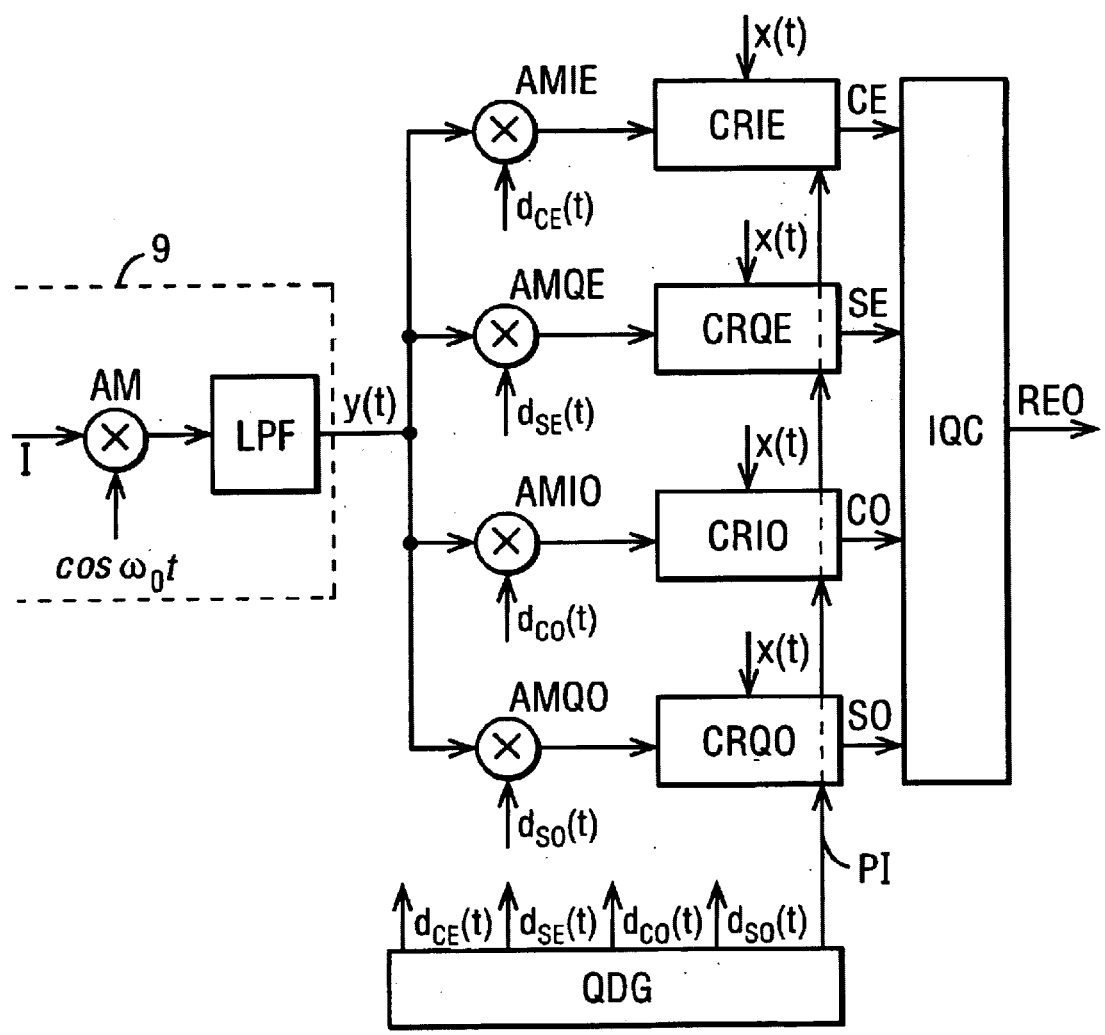
FIG. 14 is a block diagram of a four-channel Doppler-tolerant signal processor in accordance with the present invention.

FIG. 14 is a block diagram of yet another configuration of a Doppler-tolerant signal processor utilizing Doppler compensation. The system comprises four channels: a pair of in-phase channels and a pair of quadrature channels, each with their own correlator CRIE, CRQE, CRIO or CRQO. In this case, the chirps: $d_{CE}(t)$, $d_{SE}(t)$, $d_{CO}(t)$ and $d_{SO}(t)$ are supplied simultaneously during a single cycle $T_w$. Consequently, the quadrature Doppler generator has now four signal outputs, in addition to an output for a processing interval signal PI indicative of the interval over which correlation should take place. Using additional separate channels for even-cycle chirps and odd-cycle chirps reduces by half the time required for determining the combined representation REO by a suitably modified channel combiner IQC.

It is also possible to devise another configuration of the quad-channel Doppler-tolerant signal processor processor shown in FIG. 14, by exploiting the modification presented in FIG. 13.

In some applications, it may be convenient to employ a single-channel Doppler tolerant signal processor, in which the four chirps, $d_{CE}(t)$, $d_{SE}(t)$, $d_{CO}(t)$ and $d_{SO}(t)$ will be produced and used sequentially.

All the above configurations of a Doppler-tolerant signal processor, and also other similar structures, will utilize an appropriate form of a quadrature Doppler generator QDG to provide suitable auxiliary signals for Doppler frequency compensation in accordance with the present invention.

Figure 15:
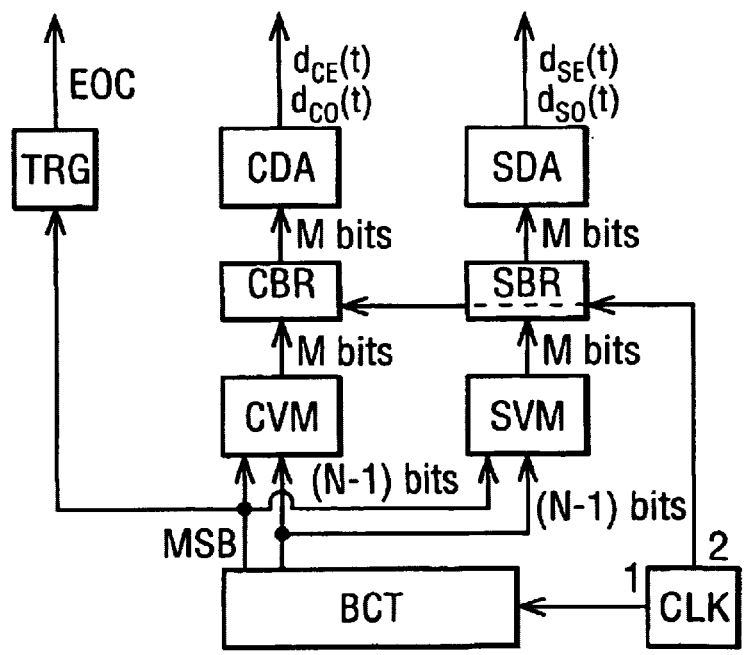
FIG. 15 is a block diagram of a quadrature Doppler generator for use in a Doppler-tolerant signal processor in accordance with the present invention.

FIG. 15 is a block diagram of a suitable quadrature Doppler generator QDG. The generator comprises an N-bit binary counter BCT, driven by a clock generator CLK, two memories, CVM and SVM, two buffer registers, CBR and SBR, two digital-to-analogue converters, CDA and SDA, and a trigger circuit TRG.

The operations performed by the quadrature Doppler generator can be summarised as follows. The most significant bit (MSB) of the output of the free-running counter BCT identifies even cycles, when MSB=0, and odd cycles, when MSB=1. The MSB and remaining (N−1) bits are used jointly to define addresses of $2^N$ cells of each memory, CVM and SVM. The memory CVM contains digital amplitude samples of a chirp $d_{CE}(t)$ at addresses with MSB=0, whereas samples of a chirp $d_{CO}(t)$ are stored at addresses with MSB=1. Similarly, the memory SVM contains digital samples of a chirp $d_{SE}(t)$ at addresses with MSB=0, whereas samples of a chirp $d_{SO}(t)$ are stored at addresses with MSB=1. Consequently, each of the four chirps is represented by $2^{N-1}$ binary words, each comprising M bits, where the number M is chosen to attain a specified accuracy of the resulting digital representation of chirp samples.

Successive digital words appearing at the outputs of memories CVM and SVM are transferred to the corresponding buffer registers, CBR and SBR, at the time instants determined by a suitably delayed pulse train available at output 2 of the clock generator CLK. Digital words held in the buffer registers CBR and SBR are then converted respectively into analogue samples by two corresponding digital-to-analogue converters, CDA and SDA. As a result, the converter CDA produces repeatedly: $2^{N-1}$ analogue samples of chirp $d_{CE}(t)$ followed by $2^{N-1}$ analogue samples of chirp $d_{CO}(t)$. Similarly, the converter SDA produces repeatedly: $2^{N-1}$ analogue samples of chirp $d_{SE}(t)$ followed by $2^{N-1}$ analogue samples of chirp $d_{SO}(t)$.

A trigger circuit, TRG, generates a short pulse at the time instants coinciding with each transition of a binary waveform representing values of the most significant bit (MSB) of successive states of the counter BCT. A sequence of such short pulses, denoted by EOC, is used to indicate the beginning of each (even or odd) cycle. The pulse train EOC is utilized in the Doppler-tolerant signal processor, shown in FIG. 9 and FIG. 13, to define integration intervals $T_w$ of the correlators, CRI and CRQ, and also to initiate various operations performed by the channel combiner IQC.

For a quad-channel Doppler-tolerant signal processor, the quadrature Doppler generator will be modified as follows. The number of bits of the binary counter BCT will be reduced to (N−1), and successive counter states will determine addresses of four memories containing digital samples of corresponding four chirps, $d_{CE}(t)$, $d_{SE}(t)$, $d_{CO}(t)$ and $d_{SO}(t)$. The output of each of the four memories will then drive a separate digital-to-analogue converter via a suitable buffer register. As a result, analogue representations of the four chirps will be available simultaneously at four outputs of such modified quadrature Doppler generator.

The modifications of the quadrature Doppler generator required for a single-channel operation will be obvious to those skilled in the art.

In order to illustrate some basic aspects of the present invention, and also to demonstrate its potential benefits, consider the following example.

Let the number of frequency components K=31 and the integer frequency shift u=4; hence, the minimum frequency and the maximum frequency are equal to $6f_p$ and $67f_p$, respectively. Assume that each of the four chirps is to be represented by 2048 discrete samples and that $w_E(t)=w_O(t)=w(t)$; assume also that $\alpha_k=b_k$ for k=1,2, . . . 31.

It has been found that the peak factor achieves its minimum value, when $\alpha_1$=+1 $\alpha_2$=+1 $\alpha_3$=+1 $\alpha_4$=+1 $\alpha_5$=+1 $\alpha_6$=+1 $\alpha_7$=+1
$\alpha_8$=−1 $\alpha_9$=−1 $\alpha_{10}$=−1 $\alpha_{11}$=+1 $\alpha_{12}$=+1 $\alpha_{13}$=+1
$\alpha_{14}$=−1 $\alpha_{15}$=−1 $\alpha_{16}$=−1 $\alpha_{17}$=+1 $\alpha_{18}$=+1 $\alpha_{19}$=−1
$\alpha_{20}$=+1 $\alpha_{21}$=+1 $\alpha_{22}$=−1 $\alpha_{23}$=−1 $\alpha_{24}$=+1 $\alpha_{25}$=−1
$\alpha_{26}$=−1 $\alpha_{27}$=+1 $\alpha_{28}$=−1 $\alpha_{29}$=+1 $\alpha_{30}$=−1 $\alpha_{31}$=+1.

Application of the above coefficients has resulted in the reduction of the peak factor value from $31/\sqrt{(31 \cdot 0.5)} \approx 7.9$ (when all components are simply added with unit coefficients) to only 1.9. It is desirable to ensure the peak factor value is less than 2.

To achieve a flat frequency response over the selected frequency range, and provide a required attenuation at all other frequencies, the discrete window function w(j) is a modified Kaiser window of the form $$w(j) = \frac{I_0(\xi\sqrt{1-m^2})-1}{I_0(\xi)-1}$$

where m=(j−1024)/1024 for j=0,1, . . . ,2047, $I_0(\cdot)$ is the modified Bessel function, and the shape parameter $\xi$ is equal to 6.24.

Samples of the four discrete chirps, $d_{CE}(j)$, $d_{SE}(j)$, $d_{CO}(j)$ and $d_{SO}(j)$, are determined from $$d_{CE}(j) = 2w(j)\sum_{k=1}^{31} a_k \cos[2\pi(2k+4)j/1024]$$

$$d_{SE}(j) = -2w(j)\sum_{k=1}^{31} a_k \sin[2\pi(2k+4)j/1024]$$

$$d_{CO}(j) = 2w(j)\sum_{k=1}^{31} a_k \cos[2\pi(2k+5)j/1024]$$

$$d_{SO}(j) = -2w(j)\sum_{k=1}^{31} a_k \sin[2\pi(2k+5)j/1024]$$

for j=0,1, . . . , 2047.

The chirps $d_{CE}(j)$, $d_{SE}(j)$, $d_{CO}(j)$ and $d_{SO}(j)$, synthesized above, can be produced by a quadrature Doppler generator QDG, with parameters N=12 and M=12.

Figure 16:
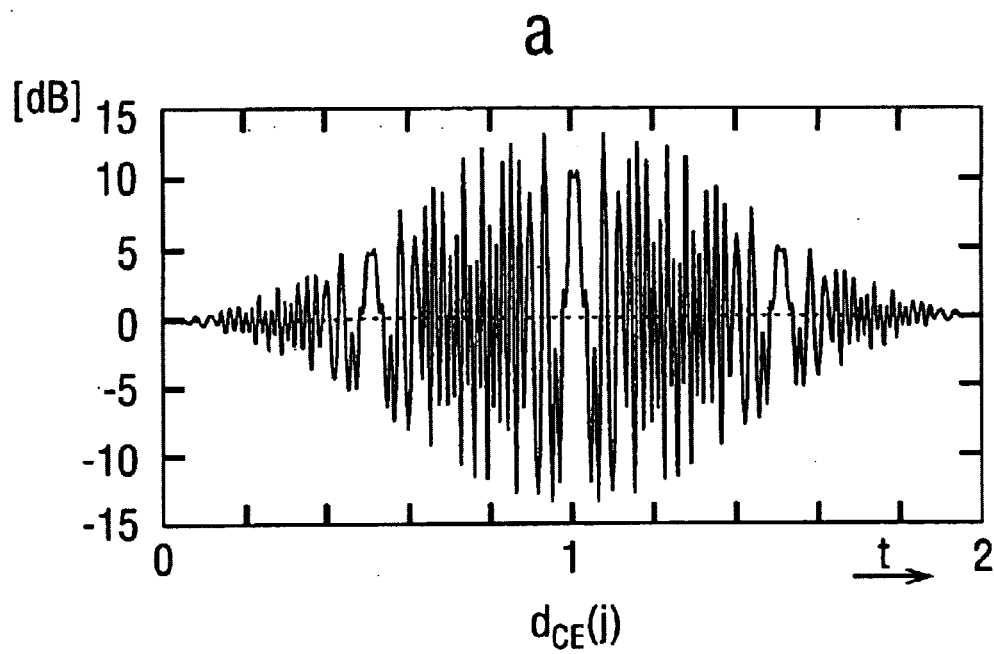
FIGS. 16(a) and (b) and FIGS. 17(a) and (b) show examples of synthesized signal portions used to construct the auxiliary representation.
Figure 16:
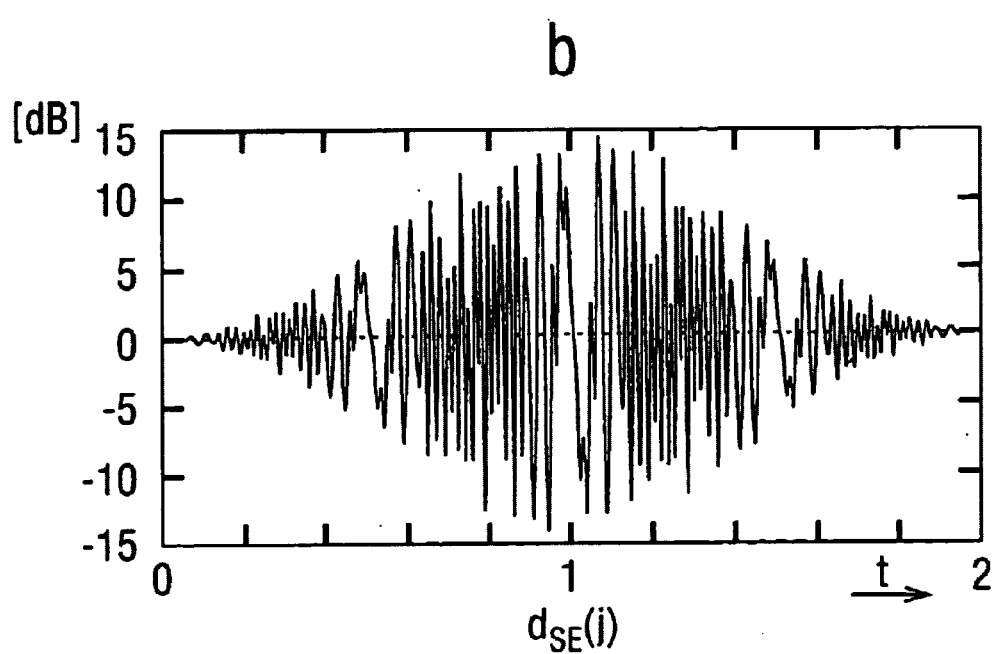
Figure 17:
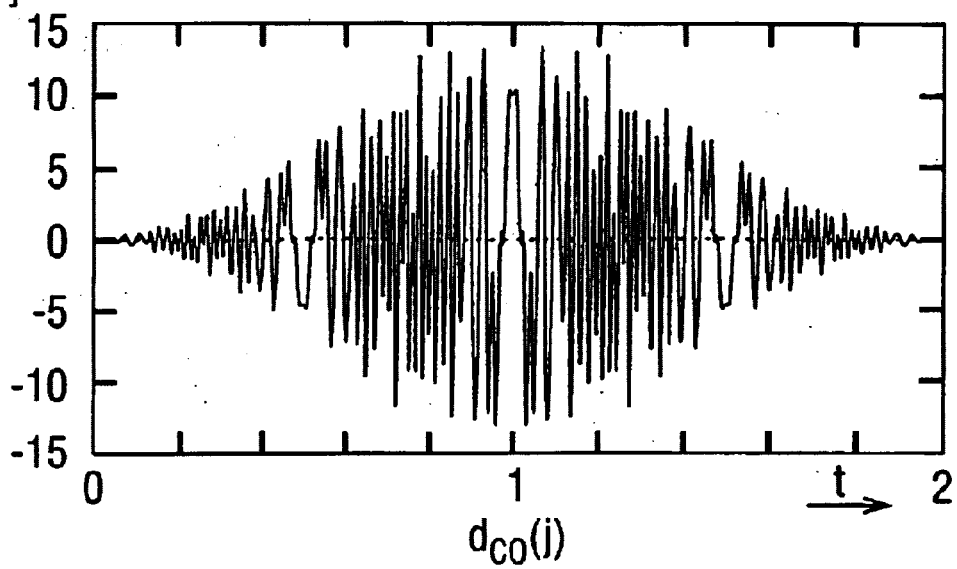
Figure 17:
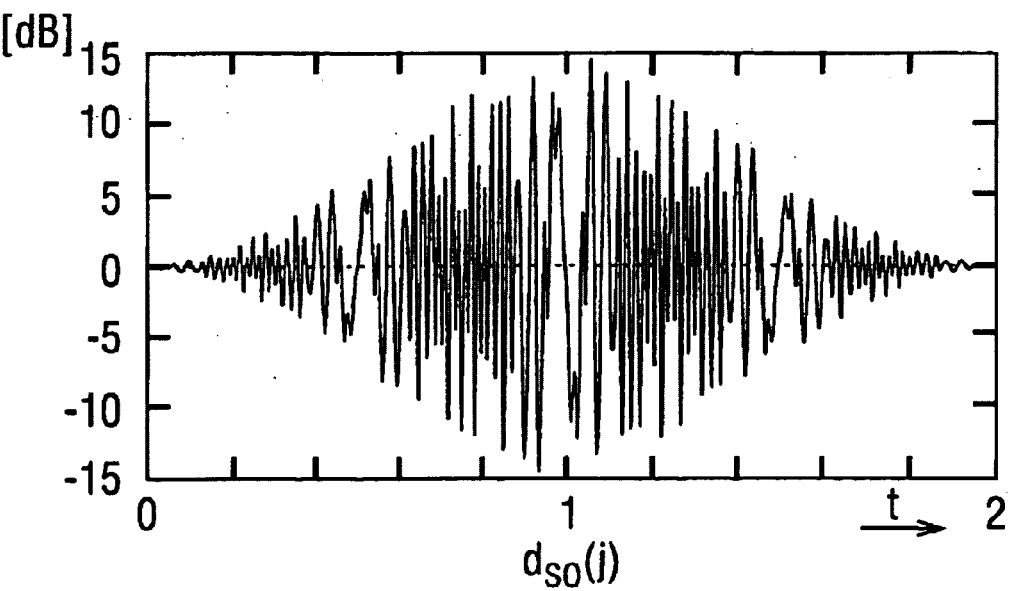

The synthesized chirps $d_{CE}(j)$, $d_{SE}(j)$, $d_{CO}(j)$ and $d_{SO}(j)$ are shown in FIG. 16 and FIG. 17. As seen, the chirps exhibit various forms of symmetry which can be exploited to reduce the memory of the quadrature Doppler generator QDG, at the expense of more complicated timing and control functions.

The chirps $d_{CE}(j)$ and $d_{SE}(j)$ are used for correlation during an even cycle to produce the results CE and SE, respectively. Those results are then combined by the channel combiner IQC as follows $$RE=\sqrt{CE^2+SE^2}$$

Figure 18:
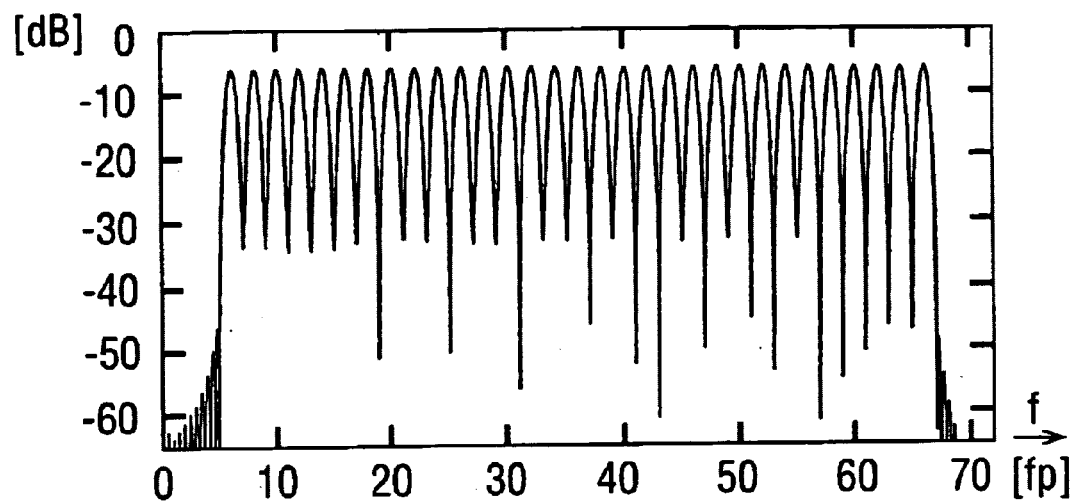
FIG. 18 shows the partial frequency response of a two-channel Doppler-tolerant signal processor employing the signal portions of FIGS. 16(a) and (b).

The resulting partial frequency response of a two-channel Doppler-tolerant signal processor is shown in FIG. 18.

Similarly, the chirps $d_{CO}(j)$ and $d_{SO}(j)$ are used for correlation during an odd cycle to produce the results CO and SO, respectively. Those results are combined by the channel combiner IQC as follows $$RO=\sqrt{CO^2+SO^2}$$

Figure 19:
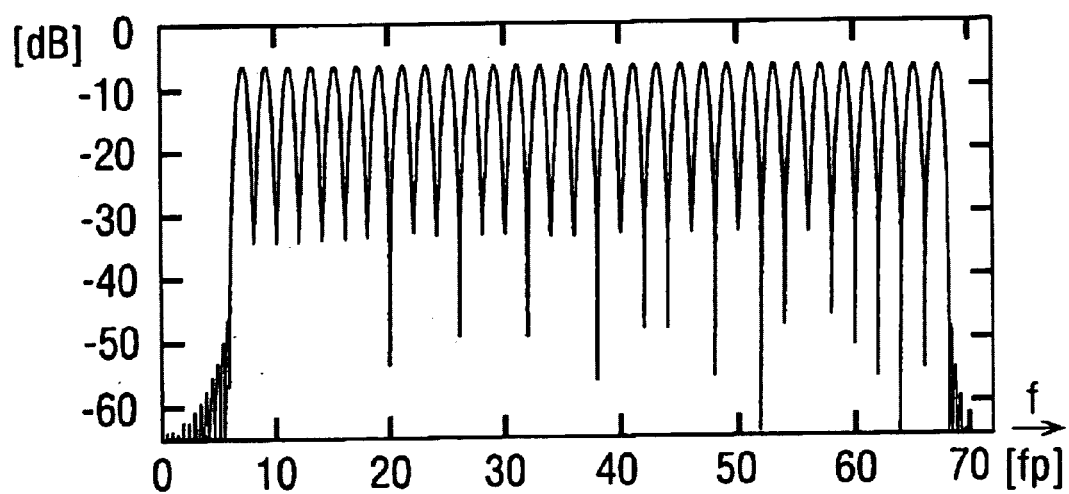
FIG. 19 shows the complementary frequency response of a two-channel Doppler-tolerant signal processor employing the signal portions of FIGS. 17(a) and (b).

The resulting complementary frequency response of a two-channel Doppler-tolerant signal processor is shown in FIG. 19.

Figure 20:
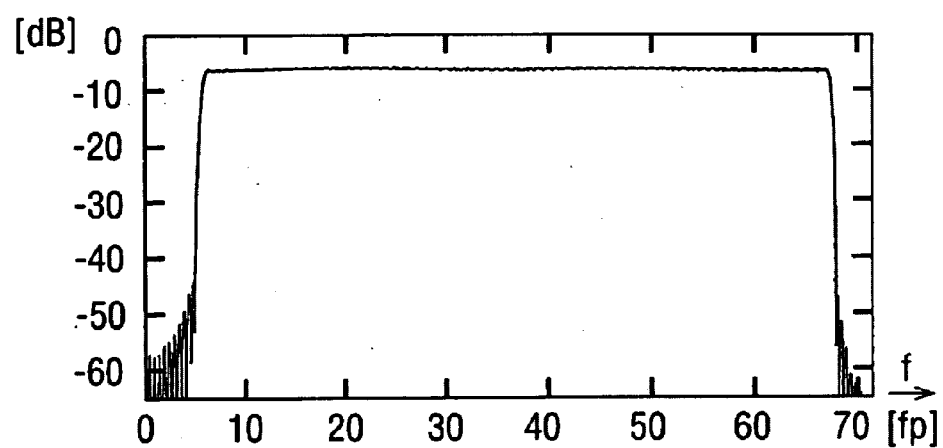
FIG. 20 shows the combined frequency response of a two-channel Doppler-tolerant signal processor employing all four signal portions.

The two frequency response characteristics are superimposed (added) to produce the combined frequency response, shown in FIG. 20. As seen, the relative attenuation at out-of-band frequencies can exceed 50 dB.

Figure 21:
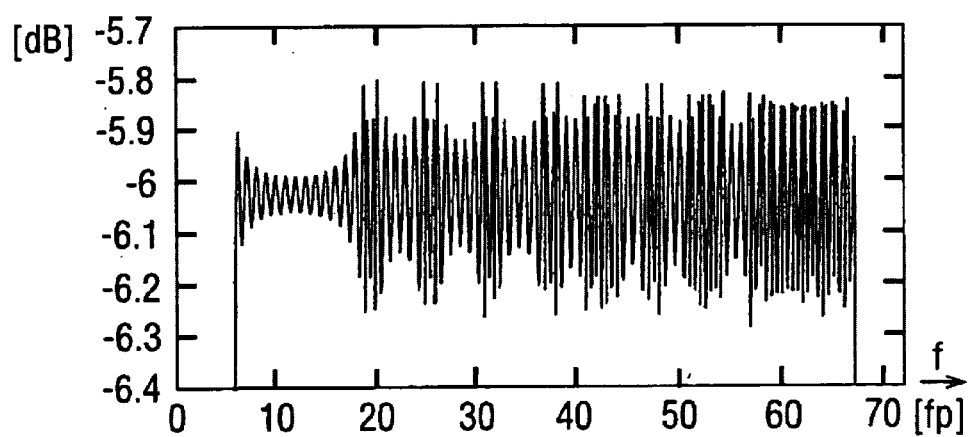
FIG. 21 shows ripples of the combined frequency response of FIG. 20.

The plot of the combined frequency response in FIG. 21 reveals that the ripples of the response do not exceed ±0.25 dB at all frequencies of interest.

Figure 22:
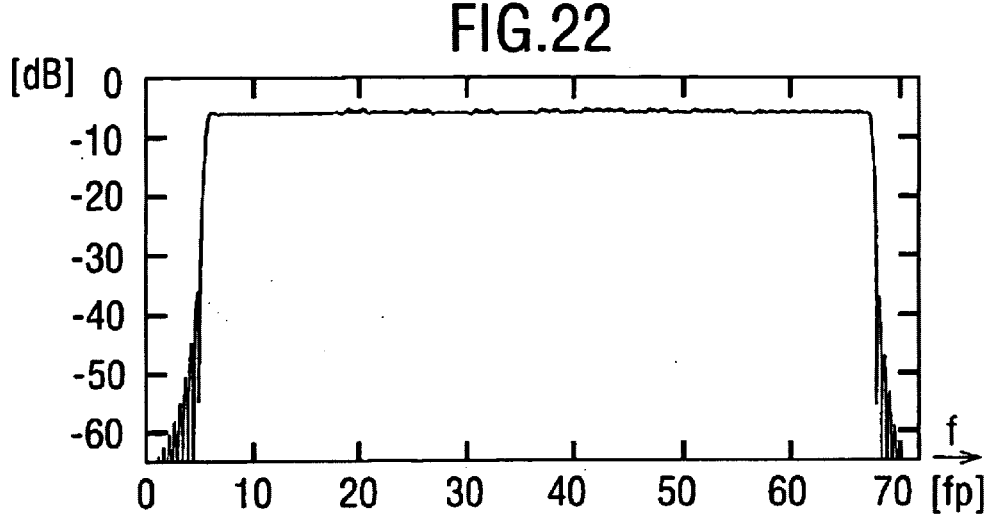
FIG. 22 shows the combined frequency response of a two-channel Doppler-tolerant signal processor employing a squared cosine window.

FIG. 22 shows the combined frequency response when the modified Kaiser window is replaced a simple cosine window of the form $$w(j) = \cos^2\left(\frac{j-1024}{1024}\frac{\pi}{2}\right)$$

for j=0,1, . . . , 2047.

Figure 23:
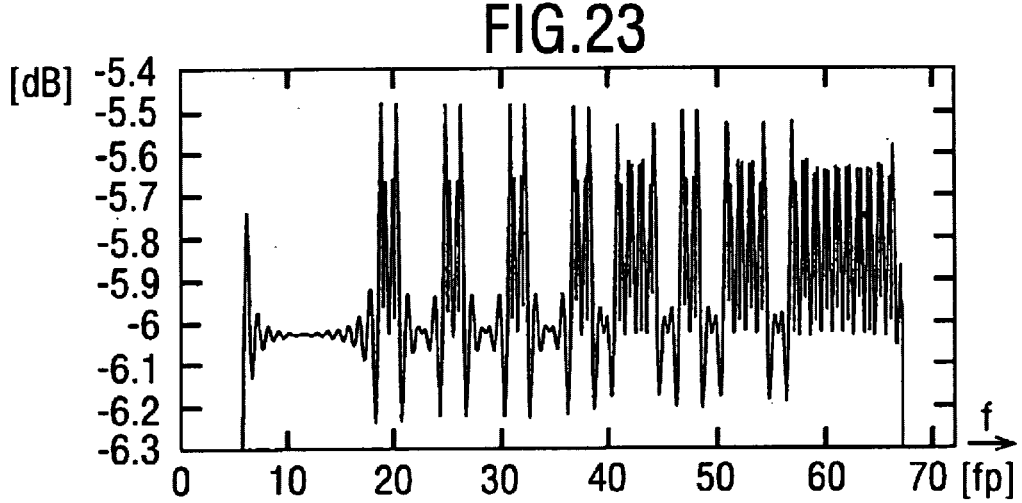
FIG. 23 shows ripples of the combined frequency response of FIG. 22.

The cosine window provides greater attenuation of stationary obstacles (when Doppler frequency is zero); however, the frequency response is not as flat as that corresponding to the modified Kaiser window. The shape and location of ripples are shown in FIG. 23.

Figure 24:
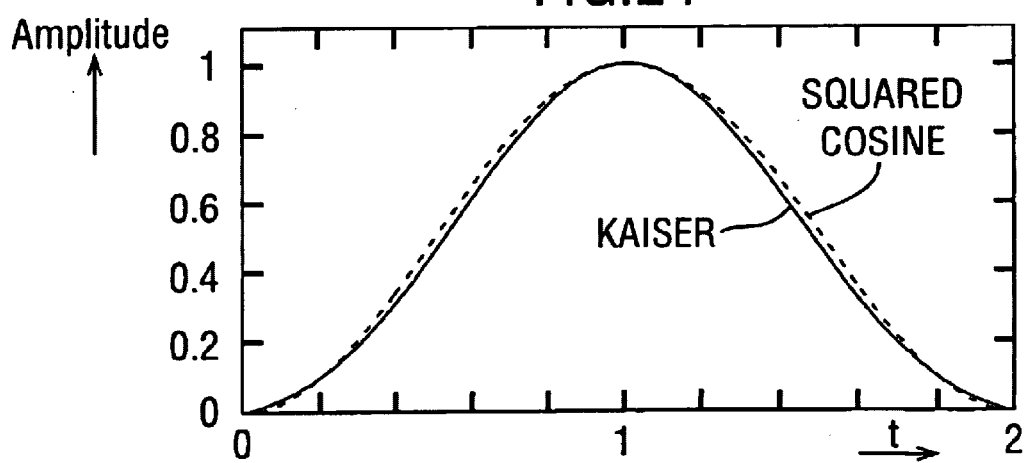
FIG. 24 shows a modified Kaiser window (solid line) and a squared cosine window (broken line).

In all the above configurations of a Doppler-tolerant signal processor, the received signal y(t) is multiplied by chirps with nonuniform envelopes determined by a selected window. Because of this loss of signal energy, the detection performance of the system can be significantly reduced. The examination of various windows utilized in a Doppler-tolerant signal processor shows that their shape is close to that of a squared cosine function. For example, FIG. 24 shows that a modified Kaiser window and a squared cosine window almost overlap. This observation and the trigonometric identity $\sin^2\phi + \cos^2\phi = 1$ suggest that the loss due to the use of windows can be almost eliminated when a received signal is processed simultaneously by two Doppler-tolerant signal processors operating in tandem configuration. While either processor employs the same set of chirps, all chirps of a duplicated set are shifted in time by $T_w/2$, where $T_w$ is the window duration.

Figure 25:
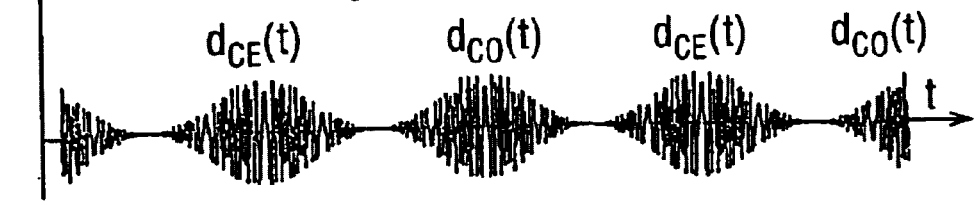
FIG. 25 shows two sets, A and B, of auxiliary signals employed by two two-channel Doppler-tolerant signal processors operating in a tandem configuration.
Figure 25:
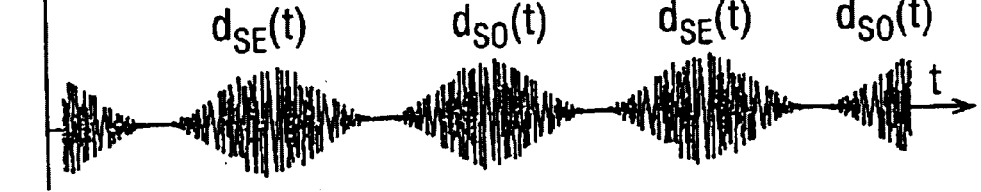
Figure 25:
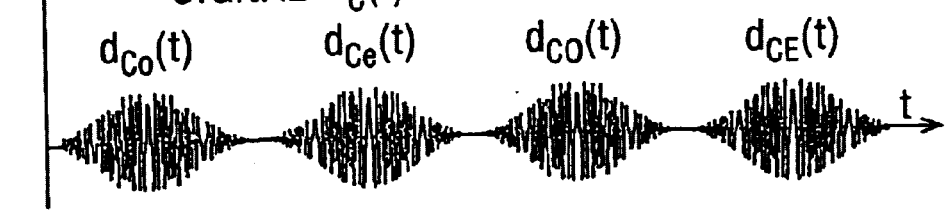
Figure 25:
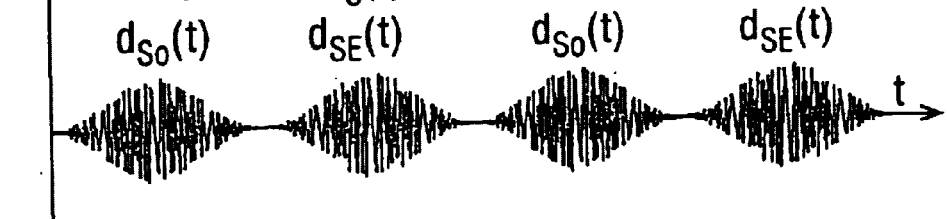

FIG. 25 shows two sets of chirps employed by a tandem arrangement comprising two two-channel Doppler-tolerant signal processors, each arranged in accordance with FIG. 9.

A more efficient system will utilize a tandem configuration comprising two quad-channel Doppler-tolerant signal processors, each developed in accordance with FIG. 14.

This technique, whereby auxiliary signals are used to investigate a primary signal, and wherein each auxiliary signal comprises finite-duration portions overlapping portions of the other auxiliary signal, is considered independently inventive. It can be applied to other areas of signal processing beyond the specific areas disclosed herein, including but not limited to arrangements in which the auxiliary signals contain components of different frequencies. It can also be extended to cover the use of more than two trains of auxiliary signals.

The correlators of the embodiments described above could be replaced by other arrangements such as a suitably modified time-delay discriminator as described in WO-A-00/39643.

What is claimed is:

1. A method of detecting a target signal, the method involving combining a primary representation of a transmitted signal, a primary representation of a received signal and an auxiliary representation, and determining from the result of the combination whether the target signal is present, characterised in that the auxiliary representation comprises a multi-frequency signal having multiple concurrent components of different Doppler shift frequencies within a frequency range corresponding to possible Doppler shifts in the target signal, whereby a received signal exhibiting a Doppler shift corresponding to a said Doppler shift frequency produces a significant response in the combination result.

2. A method as claimed in claim 1, wherein the auxiliary representation components have frequencies spread throughout the predetermined range of possible Doppler shifts, whereby a received signal which exhibits any Doppler shift within the predetermined range results in a significant response in the combination result.

3. A method as claimed in claim 1 or claim 2, wherein the different frequencies are derived from respective harmonics of a common basic frequency.

4. A method as claimed in claim 1, wherein the auxiliary representation has a finite duration, the primary representations being combined throughout that duration to produce said result.

5. A method as claimed in claim 4, wherein the auxiliary representation is formed using a predetermined amplitude window function.

6. A method as claimed in claim 1, including the step of modifying one of said primary representations with at least one further auxiliary representation, the respective auxiliary representations having components of different frequencies.

7. A method as claimed in claim 6, wherein the Doppler shift frequencies of the components of a first of the auxiliary representations are interleaved with the Doppler shift frequencies of the components of another auxiliary representation.

8. A method as claimed in claim 7, wherein the respective results produced when the auxiliary representations are modified with a primary representation are combined.

9. A method as claimed in claim 8, wherein the auxiliary representations give rise to complementary frequency response characteristics, whereby the frequency response characteristic of the combined results is substantially flat throughout said frequency range.

10. A method as claimed in claim 1, including the step of providing a first set of auxiliary representations of finite duration and a second set of auxiliary representations of finite duration, and interleaving the auxiliary representations of the first set with the auxiliary representations of the second set.

11. A method as claimed in claim 1, wherein the primary representations are combined by correlation.

12. A method as claimed in claim 1, wherein one of the primary representations is a signal which is combined with the other primary representation by being applied to a filter matched to said other primary representation.

13. A method as claimed in claim 1, when used for detecting the presence of an object which produces said target signal by reflection of said transmitted signal.

14. A method as claimed in claim 13, including determining from the result of said combination the range of the object.

15. A method as claimed in claim 1, including the step of digitally synthesizing the auxiliary representation using stored sample values.

16. A method as claimed in claim when wherein the auxiliary representation has a finite duration, the primary representations being combined throughout that duration to produce said result, and wherein the components of the auxiliary representation have phase values at the beginning of the representation which are such as to obtain a peak factor for the representation of less than two.

17. A method as claimed in claim 16, wherein the phase values of the components at the beginning of the representation are selected from a first value and a second value, the first and second values differing by $\pi$.

18. Apparatus for detecting a target signal, the apparatus being arranged to operate in accordance with a method of claim 1.

19. A method of detecting a target signal, the method involving combining a primary representation of a transmitted signal, a primary representation of a received signal and an auxiliary representation, and determining from the result of the combination whether the target signal is present, characterised in that the auxiliary representation comprises a multi-frequency signal having multiple concurrent components of different Doppler shift frequencies within a frequency range corresponding to possible Doppler shifts in the target signal, whereby a received signal exhibiting a Doppler shift corresponding to a said Doppler shift frequency produces a significant response in the combination result;

wherein the auxiliary representation has a finite duration, the primary representations being combined throughout that duration wherein the duration is substantially equal to an integral number of periods of the lowest frequency component.

20. A method of detecting a target signal, the method involving combining a primary representation of a transmitted signal, a primary representation of a received signal and an auxiliary representation, and determining from the result of the combination whether the target signal is present, characterised in that the auxiliary representation comprises a multi-frequency signal having multiple concurrent components of different Doppler shift frequencies within a frequency range corresponding to possible Doppler shifts in the target signal, whereby a received signal exhibiting a Doppler shift corresponding to a said Doppler shift frequency produces a significant response in the combination result; and including the step of using first and second auxiliary representations, the components of the first auxiliary representation being in quadrature relationship with corresponding including the step of simultaneously modifying the first and second auxiliary representations with respective versions of one of the two primary representations and combining the respective modified representations with the other primary representation to produce a result indicative of the presence of the target signal.

21. A method of detecting a target signal, the method involving combining a primary representation of a transmitted signal, a primary representation of a received signal and an auxiliary representation, and determining from the result of the combination whether the target signal is present, characterised in that the auxiliary representation comprises a multi-frequency signal having multiple concurrent components of different frequencies within a frequency range corresponding to possible frequency discrepancies between the transmitted and received signals, whereby a received signal exhibiting a discrepancy corresponding to a said frequency produces a significant response in the combination result.

22. A method of detecting a target signal, the method involving combining a primary representation of a transmitted signal, a primary representation of a received signal and an auxiliary representation, and determining from the result of the combination whether the target signal is present, characterised in that the auxiliary representation comprises a multi-frequency signal having multiple concurrent components of different Doppler shift frequencies within a frequency range corresponding to possible Doppler shifts in the target signal, whereby a received signal exhibiting a Doppler shift corresponding to a said Doppler shift frequency produces a significant response in the combination result;

wherein the auxiliary representation has a finite duration, the primary representations being combined throughout that duration to produce said result;

wherein the duration is substantially equal to an integral number of periods of the lowest frequency component; and wherein the auxiliary representation is formed using a predetermined amplitude window function.

23. A method of detecting a target signal, the method involving combining a primary representation of a transmitted signal, a primary representation of a received signal and at least first and second auxiliary representations, and determining from the result of the combination whether the target signal is present, wherein each auxiliary representation comprises finite duration portions time-wise interleaved with the finite portions of the other auxiliary representation, each finite portion having multiple concurrent components of different possible Doppler shift frequencies within a frequency range corresponding to possible Doppler shifts in the target signal, whereby a received signal exhibiting a Doppler shift corresponding to a said frequency produces a significant response in the combination result, the frequencies of the components of the first auxiliary representation being interleaved with the frequencies of the components of the second auxiliary representation.

24. A method as claimed in claim 23, including the step of using third and fourth auxiliary representations, the components of the first auxiliary representation being in quadrature relationship with corresponding components in the third auxiliary representation and the components of the second auxiliary representation being in quadrature relationship with corresponding components in the fourth auxiliary representation.

25. A method as claimed in claim 24, the method including the step of combining the first and second auxiliary representations with a first version of one of the two primary representations and combining the third and fourth auxiliary representations with a second version of said one of the two primary representations, and combining the respective modified primary representations with the other primary representation to produce a result indicative of the presence of the target signal.

26. A continuous wave obstacle-detection system arranged to operate in accordance with a method according to claim 23.

* * * * *